United States Patent [19]

Richey et al.

[11] 4,228,637
[45] Oct. 21, 1980

[54] COMPRESSIBLE MATERIAL TREATING DEVICE

[75] Inventors: Clarence B. Richey, West Lafayette; Samuel D. Parsons, Lafayette; Victor L. Lechtenberg; Donald A. Holt, both of West Lafayette, all of Ind.

[73] Assignee: Purdue Research Foundation, West Lafayette, Ind.

[21] Appl. No.: 905,862

[22] Filed: May 15, 1978

[51] Int. Cl.³ .................. A01D 39/00; A23K 1/00
[52] U.S. Cl. ........................... 56/341; 100/88; 100/73; 100/153; 426/319; 426/335; 428/636
[58] Field of Search ............ 426/319, 320, 636, 69, 426/312, 635, 474, 335, 532, 454, 455, 468, 506, 507; 100/89, 71, 73–75, 137–139, 151–154, 161, 176; 56/341

[56] References Cited

U.S. PATENT DOCUMENTS

| | | | |
|---|---|---|---|
| 2,293,845 | 8/1942 | Millar | 426/319 |
| 3,834,141 | 9/1974 | Bracht et al. | 56/341 |
| 3,914,926 | 10/1975 | Braunberger et al. | 56/341 |
| 3,996,848 | 12/1976 | Molitorisz | 100/73 |
| 4,064,276 | 12/1977 | Conradsen et al. | 426/636 |
| 4,121,513 | 10/1978 | Kopaska | 56/341 |

FOREIGN PATENT DOCUMENTS 1055931  4/1959  Fed. Rep. of Germany ........... 426/319

Primary Examiner—R. B. Penland
Attorney, Agent, or Firm—John R. Nesbitt; Robert E. Harris

[57] ABSTRACT

A device and method are disclosed for treating compressible materials, such as hay or other fibrous materials, with a treating substance, preferably anhydrous ammonia, as a preservative for the treated compressible material. The treating substance is preferably introduced into a treating area as a gas, but may be introduced in aqueous or liquid form to establish a fog of treating substance in the treating area.

The compressible material to be treated is introduced into the treating area which preferably has air locks, established by a pair of pressure rollers, at both the compressible material inlet and outlet to maintain the treating substance within the treating area.

Within the treating area, a path is established for continuous movement of the compressible materials from the inlet to the outlet rollers. This path is shown to be established by a pair of endless conveyor belts forming an arcuate path through which the compressible material is conveyed by the belts, by spaced arcuate guides having spikes extending therethrough to cause movement of the compressible material along the path established by the guides, and by spaced straight bars extending downwardly at an angle from inlet to outlet so that compressible material moves under the force of gravity from the inlet to the outlet.

The treating substance introduced into the treating area is maintained under constant circulation by a fan so that the compressible material is entirely and uniformly contacted while in the treating area.

27 Claims, 4 Drawing Figures

U.S. Patent    Oct. 21, 1980    Sheet 2 of 2    4,228,637

COMPRESSIBLE MATERIAL TREATING DEVICE

FIELD OF THE INVENTION

This invention relates to a compressible material treating device and method and, more particularly, relates to a device and method for treating compressible material, such as hay or other fibrous materials, with a treating substance which acts as a preservative for the compressible materials.

BACKGROUND OF THE INVENTION

The traditional method of making hay is to cut the standing crop with a mower and allow it to air dry while lying in the swath in the field. Once the hay has dried to approximately 20% moisture or below, it is raked into windrows and baled and/or stacked either in open stacks or under shelters. Sometimes, the crop is crushed after cutting in order to hasten drying, and sometimes the crop is raked into windrows, before it is air dry, so that handling of the dry crop is reduced.

The greatest mechanical losses occur when the crop is handled in the dry state because dry leaves shatter and are lost. Besides mechanical loss, dry matter losses occur during the drying process because of metabolic activity of the plant and some activity of bacteria and fungi. When the moisture content of the hay drops to 20% or less, metabolic activity of the plant tissues and of bacteria and fungi drops to a very low level.

The chief disadvantage of this method is that the crop must lie in the field during the drying process, and there is considerable risk that it will be damaged or destroyed by rain. At present, only costly artificial drying equipment permits storage of hay that is not fully dried in the field. Hay that is stored with moisture levels above 20% is likely to deteriorate badly due to fungi and bacterial action. When moisture content exceeds 30%, such deterioration is certain. Sometimes the heat generated by metabolic activity in moist hay triggers processes leading to spontaneous combustion. This endangers not only the hay but also the structure in which it is stored.

Crop residue, such as corn stalks, are picked up by flail type implements and stacked. Sometimes, the residues are blown into wagons directly from the grain harvesting machine and then stacked. Drying conditions after fall grain harvest are generally poor. Frequently, the moisture content of the residual material exceeds 20% when it is stacked, and it often becomes moldy or musty. In this condition, its acceptability to animals and its nutritional value are considerably reduced.

Several products are now in use as hay preservatives. These are organic acids, such as propionic acid and its derivatives. They serve primarily as fungicides and do not enhance the quality of the original product.

Thus, it can be appreciated from the foregoing that devices and methods have been needed to allow better and more efficient ways of making hay and storing the same. Included is the necessity to better preserve the hay and thus facilitate making and storing the same. The same is likewise true of at least some other compressible fibrous materials.

SUMMARY OF THE INVENTION

This invention provides a device and method to enable treatment of compressible materials, such as hay or other fibrous material, with a treating substance. Where the treating substance is anhydrous ammonia which acts as a preservative for hay and crop residue, the treated materials can be stored at higher initial moisture content without the severe dry matter and quality losses normally associated with storing untreated materials before they are fully air dry. The use of anhydrous ammonia has also been found to not only serve as an effective fungicide, but also enhances the quality of the product by increasing its crude protein concentration and increasing the digestibility of the fiber in the product. The device of this invention is shown in several forms and accomplishes the ammonia treatment of hay in a continuous manner so that the treatment can be carried out in a baling or harvesting machine as it moves through the field picking up the material to be treated. Since the device and method of this invention permits treatment of a continuously moving stream of compressible fibrous materials with a continuously moving treating substance, it can be likewise used to treat other compressible materials besides hay and crop residues which have been specifically mentioned.

It is therefore an object of this invention to provide an improved device and method for treating compressible materials such as hay and other fibrous material.

It is another object of this invention to provide an improved device and method for treating compressible materials such as hay and other fibrous materials with a preservative.

It is still another object of this invention to provide an improved device and method for treating compressible materials by contacting such materials with anhydrous ammonia.

It is yet another object of this invention to provide an improved device and method for treating continuously moving compressible materials by directing anhydrous ammonia in gas form toward contact with said materials.

It is yet another object of this invention to provide an improved device that includes a treating area with compressible material to be treated being conveyed through the treating area and a treating substance being applied by being brought into contact therewith while within the treating area to thus completely treat said materials.

It is yet another object of this invention to provide an improved device for treating compressible materials wherein the materials are conveyed through a treating area where said materials are exposed to a gaseous preservative which is absorbed by said materials while at said treating area.

It is still another object of this invention to provide an improved method for treating compressible materials by moving the materials through a treating area and exposing treating substances thereto while at the treating area to thus completely treat all of said materials while within said treating area.

It is yet another object of this invention to provide an improved method for compressible material wherein the material is introduced into and moved along a path within a treating area and a treating substance is circulated through the treating area and into contact with said compressible materials as said materials are moved along said path whereby said materials absorb said treating substance.

With these and other objects in view which will become apparent to one skilled in the art as the description proceeds, this invention resides in the novel construction, combination, arrangement of parts and method substantially as hereinafter described, and more particularly defined by the appended Claims, it being understood that such changes in the precise embodiment of the herein disclosed invention are meant to be included as coming within the scope of the Claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
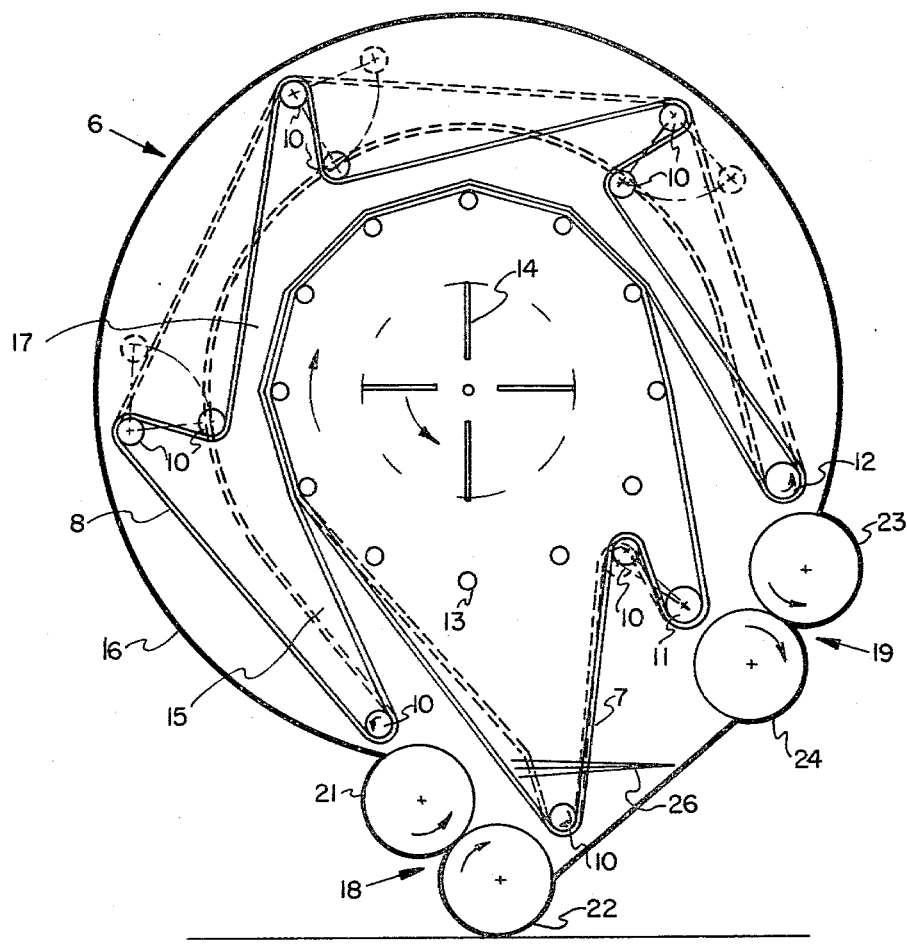
FIG. 1 is a partial side view illustrating one embodiment of the device of this invention.

Referring now to the drawings, in the embodiment of the invention as shown in FIG. 1, the device 6 includes a pair of inner and outer endless flexible steel conveyor belts 7 and 8 wound about spaced pulleys, or rollers, 10. Inner belt 7 is driven by drive roller 11, while outer belt 8 is driven by drive roller 12. As also shown in FIG. 1, inner belt 7 is partially wrapped about idler drum 13 which has a fan 14 mounted therein.

An arcuate path 15 is established within housing 16 by the endless belts to convey compressible material through the treating area 17 from an inlet 18 to an outlet 19. Rollers 21 and 22 are positioned at inlet 18 to receive compressible materials therebetween. Rollers 21 and 22 are pressure rollers and are elastically deformable or biased toward one another to form an air lock at the inlet. Compressible material, such as hay to be treated, is received between the rollers and fed into the treating area.

The conveyors 7 and 8 then convey the material through the treating area in an arcuate path as shown in FIG. 1. After passing through the treating area, the treated material is discharged through outlet 19 which has a pair of rollers 23 and 24 thereat and between which the treated material is discharged from the treating area. Rollers 23 and 24 are also elastically deformable or biased toward one another and form an air lock at outlet 18. Drive rollers 11 and 12 and pressure rollers 21–24 are conventionally driven at a speed sufficient to maintain the compressible material within the treating area under continuous movement but within the area a sufficient time to allow full treatment.

While in the treating area, the compressible materials are treated by circulating treating material through the treating area by means of fan 14. In addition, a treating substance inlet 26 is provided through which the treating material, preferably anhydrous ammonia, is inserted into the treating area, preferably as a gas although it can be introduced in liquid form to establish a fog of treating material within the treating area. The treating substance is propelled by fan 14 outwardly so that it is brought into contact with the compressible material passing through the treating area. The treating substance thus contacts and penetrates through the entire mass of compressible material being passed through the area and thus uniform and complete treatment is effected as the material is moved through the chamber with the material absorbing the treating substance which acts as a preservative for the thus treated compressible material.

The treating material is continuously circulated, replenished by inlet 26, and returned to fan 14 where it is again directed to the compressible material.

Figure 2:
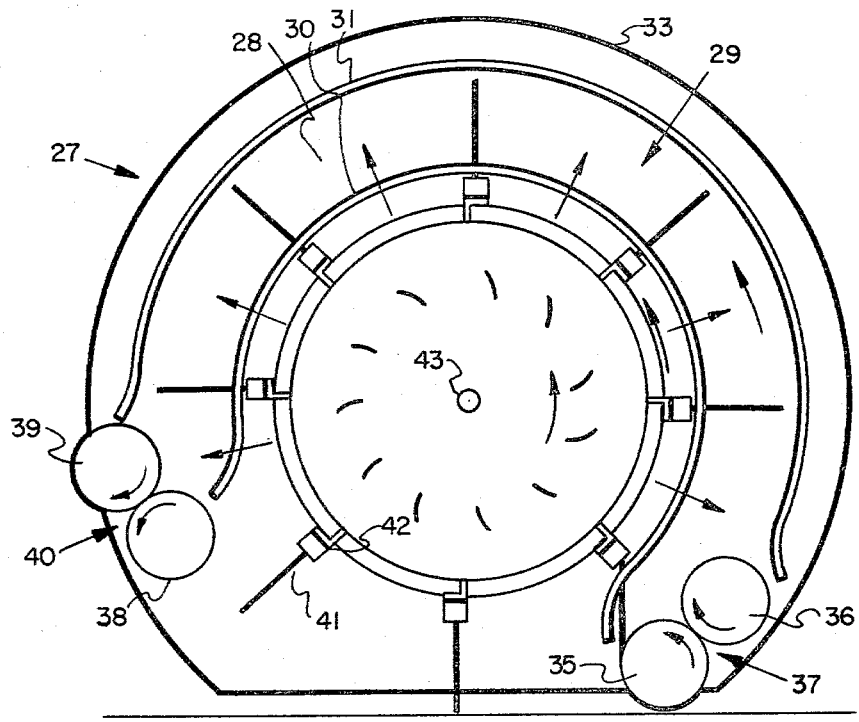
FIG. 2 is a partial side view illustrating a second embodiment of this invention.
Figure 3:
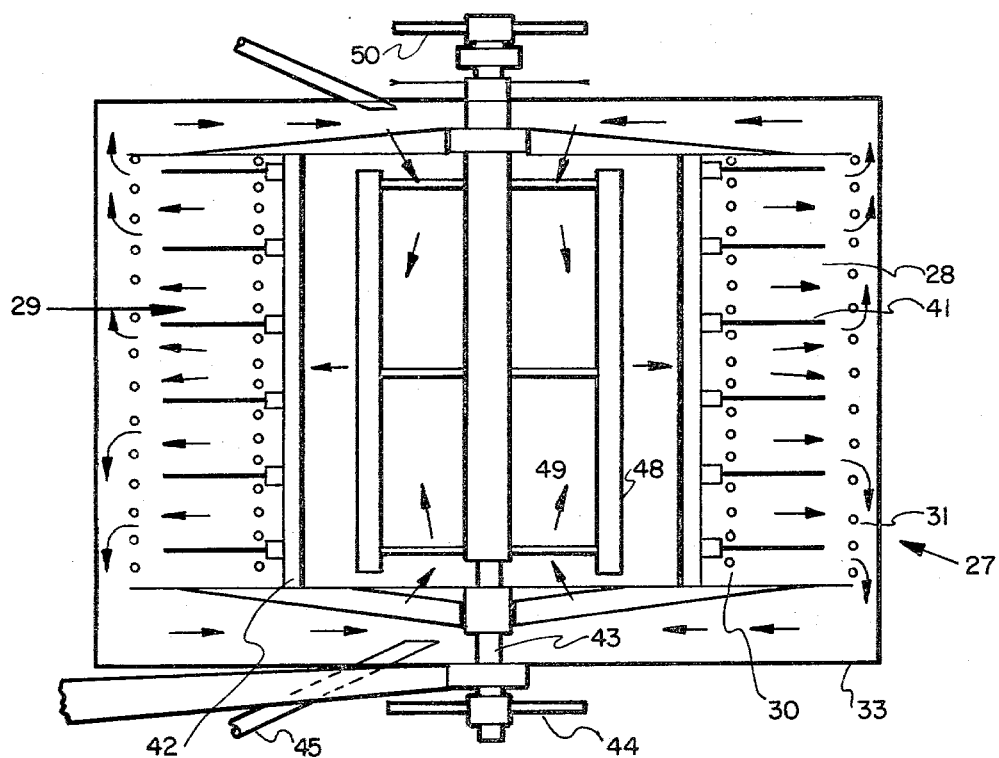
FIG. 3 is a top sectional view of the embodiment of the invention as shown in FIG. 2.

In FIGS. 2 and 3, another embodiment 27 is shown wherein the compressible material is again moved through an arcuate path 28 within the treating area 29. In this embodiment, path 28 is provided by spaced rods 30 and 31 within a housing 33. Pressure rollers 35 and 36 are again provided at the inlet 37 to receive the compressible materials and pressure rollers 38 and 39 are provided to discharge the compressible materials from outlet 40 after treatment.

The compressible materials are moved along path 28 by means of spikes, or fingers, 41 spring mounted on the periphery of drum 42, which drum is mounted for rotation on shaft 43 which also has mounted thereon sprocket 44. Rotation of drum 42 causes the spikes, which extend between the inner rods, or guides 30, to move through the path 28 and contact the compressible materials therein to convey the same along the path from inlet 37 to outlet 40. Rods 30 and 31 each include a plurality of spaced rods as needed.

A treating substance inlet 45 is provided with the enclosure to introduce the treating substance, preferably anhydrous ammonia, into the treating area with the treating substance being maintained in the treating area by the air locks provided by the rollers at inlet 37 and outlet 40. A centrifugal fan 48 is provided to propel the treating substance through the compressible material. Fan 48 is mounted on sleeve 49 on shaft 43 and sleeve 49 has a pulley 50 mounted thereon for rotation of the fan.

The treating material, which is preferably anhydrous ammonia, and in all embodiments shown may be mixed with air, is recirculated by passing from the path 28 through rod 31 and the outer periphery within housing 33 back to an 48. Sprocket 44 is mounted on shaft 43 and can be connected (not shown) to provide drive for rollers 35, 36, 38, and 39. Drum 42 may be driven, for example, from ground wheels (not shown) so that the speed will be about ground speed, while fan 48 may be driven by tractor power takeoff (not shown) or a hydraulic motor (not shown). Treatment occurs in the same manner as described in connection with the embodiment shown in FIG. 1.

A third embodiment 53 of the invention is shown in FIG. 4 where again the compressible materials are moved along a path 54 within treating area 55 from inlet 56 to outlet 57. Inlet pressure rollers 62 and 63 and outlet pressure rollers 59 and 60 are provided to form air locks and to receive the compressible materials therebetween. The pressure rollers may be commonly connected by belt 64 mounted on pulleys 65–68 associated with the pressure rollers. A conventional external drive can be utilized to drive the rollers.

Figure 4:
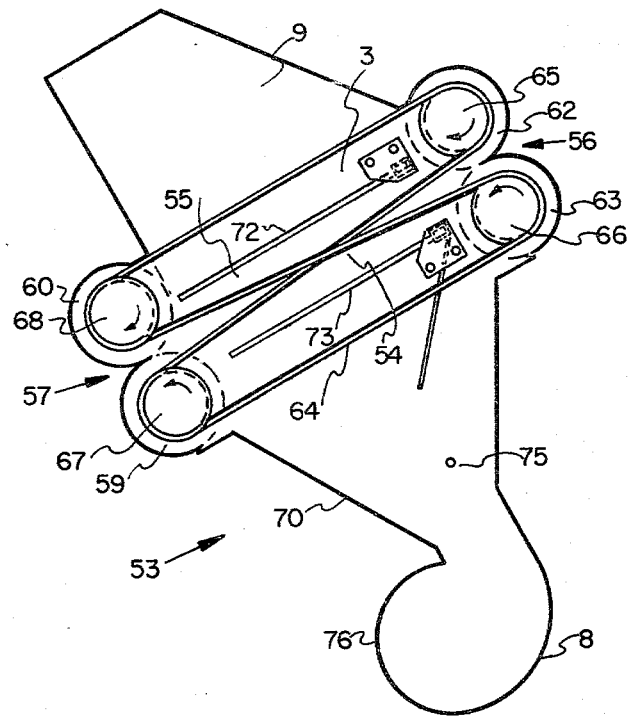
FIG. 4 is a side view illustrating a third embodiment of this invention.

A housing 70 is also provided and the path 54 of the compressible materials within the treating area within housing 70 is provided between a plurality of spaced upper and lower straight rods or guides 72 and 73. Each of rods 72 and 73 include a plurality of spaced rods. As shown in FIG. 4, the guides are positioned at a downward angle from the inlet 56 to the outlet 57 so that the compressible material moves from the inlet to the outlet due to force of gravity (and possibly by being pushed through the treating area by newly introduced material at the inlet).

Treating material is introduced into the treating area through inlet 75. A fan 76 is provided below the guides 72 and 73 to propel the treating material toward the path of the compressible materials between the guides so the treating material is brought into contact with the materials to treat the materials in the same manner described hereinabove. As also described hereinabove, the treating materials are recirculated to the fan through a return duct (not shown) so that the treating material is continuously brought into contact with compressible material within the treating area.

The use of a preservative permits storing of compressible materials such as hay and crop residue at higher initial moisture content thus reducing weather hazards to the materials while they lay in the field and reducing losses caused by handling the materials when they are dry. Since field losses are principally leaves and soluble constituents, the quality of materials harvested using a preservative is potentially higher than materials harvested in the conventional manner.

Initial experiments on anhydrous ammonia as a hay preservative involved releasing ammonia gas slowly into stacks of baled hay through a hose or pipe. While this method was basically effective, it did not treat the stack uniformly. Certain areas in the stack, principally the lower more compressed areas were sometimes not effectively treated and some spoilage occurred in these situations. The basic problem was that ammonia is very rapidly absorbed by the moisture in the hay and sometimes did not reach less accessible parts of the haystacks in high enough concentrations to kill or inhibit the mold organisms.

This invention, by continuous feeding of compressible materials and thus treating only a small amount of material at any instant, allows the treating material to completely surround and infuse the compressible material to bring about a very effective, long lasting treatment. It also permits a continuous operation which is more efficient than any previous approach.

The use of ammonia as a hay preservative is a new development and has not been used heretofore in forage harvest operations. In addition, practical methods and apparatus for applying the ammonia (gas or fog) have not heretofore existed.

It has been found that a continuous stream of hay can be effectively treated utilizing the device and method of this invention to contact the hay with anhydrous ammonia in a confined treating area. By controlling the speed at which the hay passes through the treating area, through exposure of all of the hay surface can be treated by circulating the anhydrous ammonia through the porpous hay mass. It has been found that an air velocity of about 8 miles per hour is suitable to propel the anhydrous ammonia through the hay mass. It has also been found that two seconds of exposure of hay in the treating area to a 50% $NH_3$ concentration provides an adequate treatment.

While this invention is particularly useful in respect to treating hay with anhydrous ammonia, the device and method of this invention can also be satisfactorily utilized to preserve grass, legume, or mixed hay and various crop residues including cornstalks. The device and method can also be utilized in other situations where it is desirable to threat a moving stream of compressible fibrous material with a confined gas.

The ammonia can also be sprayed on a moving stream of material in gaseous form or as cold liquid anhydrous ammonia if the spray droplets are very fine, creating a fog of ammonia in the chamber. If liquid ammonia contacts moist hay, however, it immediately combines with the moisture, producing only localized treatment.

Thus, as can be appreciated from the foregoing, this invention provides an improved device and method for treating materials such as hay and other fibrous materials with a treating substance such as anhydrous ammonia acting as a preservative.

What is claimed is:

1. A device for treating fibrous plant materials, said device comprising:
   housing means providing a treating space that is closed except for an inlet and an outlet;
   means to supply a preservative as a treating substance to said treating space;
   propelling means for creating a continuously moving flow of said treating substance through said treating area;
   first roller means positioned at said inlet of said housing means for receiving fibrous plant materials to be treated, said first roller means being movable and closing said inlet except to permit introduction of said received fibrous plant materials into said treating space;
   means establishing a path for conveying fibrous plant material from said inlet through said treating space and into contact with said treating substance within said treating space whereby said fibrous plant material is substantially treated by contact with said treating substance while in said treating space; and
   second roller means positioned at said outlet of said housing means for receiving treated fibrous plant material, said second roller means being movable and closing said outlet except to permit discharge of received treated fibrous plant material from said treating space.

2. The device of claim 1 wherein said first and second roller means each include contiguous rollers receiving said fibrous plant material therebetween.

3. The device of claim 2 wherein said rollers are driven to introduce fibrous plant material into said treating area and discharge treated material from said treating area at predetermined rates.

4. The device of claim 2 wherein said rollers are biased toward one another to form an air lock at said inlet and outlet means.

5. The device of claim 1 wherein said path establishing means comprises conveying belts for conveying said fibrous plant material along said established path through said treating area.

6. The device of claim 5 wherein said conveying belts provide an arcuate path for movement of said fibrous plant material through said treating area.

7. The device of claim 6 wherein said conveying belts are endless belts which are driven to convey said fibrous plant material through said treating area.

8. The device of claim 1 wherein said path establishing means are rods establishing a substantially straight path for movement of fibrous plant material through said treating area.

9. The device of claim 1 wherein said device includes spaced guides establishing said path for fibrous plant material, and a plurality of spikes extending into said established path between said guides for conveying material along said path through said treating area.

10. The device of claim 1 wherein said preservative is anhydrous ammonia.

11. The device of claim 1 wherein said device includes means for applying said treating substance as a gas to said material within said treating area.

12. The device of claim 11 wherein said gas is anhydrous ammonia and wherein said fibrous plant material is a moving stream of fibrous materials brought into contact with said anhydrous ammonia while in said treating area.

13. The device of claim 12 wherein said fibrous plant material is a moving stream of hay.

14. The device of claim 1 wherein said device includes a means for applying said treating substance in liquid form, said treating substance forming a fog in said treating area.

15. The device of claim 1 wherein said propelling means includes a fan and return means whereby said treating substances are continuously circulated through said fibrous plant material in said treating area to completely surround and infuse said fibrous plant material with treating substance.

16. A device for treating fibrous plant materials, said device comprising:
   housing means defining a substantially closed treating area, said housing means having an inlet and an outlet;
   means to supply anhydrous ammonia to said treating area;
   inlet means positioned at the inlet of said housing means whereby said inlet means controls access to said treating area, said inlet means including a pair of rollers for receiving fibrous plant material therebetween, said inlet means closing said inlet of said housing means except to permit introduction of said fibrous plant material into said treating area;
   means establishing a path from said inlet means for continuous movement of said fibrous plant material through said treating area;
   fan means for causing continuous movement of said anhydrous ammonia through said treating area whereby anhydrous ammonia is circulated through said fibrous plant material in said path to uniformly treat said material and allow said material to absorb said anhydrous ammonia; and
   outlet means positioned at the outlet of said housing means whereby said outlet means controls discharge from said treating area, said outlet means including a pair of rollers for receiving treated fibrous plant material therebetween, said outlet means closing said outlet of said housing means except to permit discharge of said treated material from said treating area.

17. The device of claim 16 wherein said pair of rollers of said inlet and outlet means are pressure rollers elastically deformable and/or biased toward one another and forming an air lock to maintain said anhydrous ammonia within said treating area.

18. The device of claim 16 wherein said device includes return means for anhydrous ammonia after passing through said path within said treating area whereby said anhydrous ammonia is maintained in continuous movement through said path to contact continuously moving fibrous plant materials in said path.

19. A device for treating fibrous plant material, said device comprising:
   housing means defining a substantially closed treating area, said housing means having an inlet and an outlet;
   inlet means at said inlet of said housing means whereby said inlet means controls access to said treating area, said inlet means including a pair of rollers between which fibrous plant material is received for introduction into said treating area, said inlet means closing the inlet of said housing means except to permit introduction of said fibrous plant material into said treating area;
   a pair of endless conveyor belts establishing a path for received fibrous plant material and conveying said material through said treating area at the rate of movement of said belt;
   means to supply a preservative as a treating material to said treating area;
   fan means to cause movement of said treating material through said treating area and into contact with fibrous plant material conveyed by said endless conveyor belts whereby said fibrous plant material is treated while being conveyed through said treating area; and
   outlet means at said outlet of said housing means whereby said outlet means controls discharge from said treating area, said outlet means including a pair of rollers between which treated fibrous plant material is discharged from said treating area, said outlet means closing the outlet of said housing means except to permit discharge of said treated material from said treating area.

20. The device of claim 19 wherein said endless conveyor belts are flexible steel belts mounted on rollers, and wherein said belts and said rollers at said inlet and outlet means are driven at predetermined rates to maintain a constant flow of fibrous plant material through said device.

21. The device of claim 20 wherein said path through said treating area established by said endless conveyor belts is an arcuate path, and wherein said fan means is inwardly positioned with respect to said path to cause movement of treating material outwardly so as to be circulated through said fibrous plant material in said path.

22. A device for treating fibrous plant materials, said device comprising:
   housing means defining a substantially closed treating area, said housing means having an inlet and an outlet;
   inlet means at said inlet of said housing means whereby said inlet means controls access to said treating area, said inlet means including a pair of rollers between which fibrous plant material is received, said inlet means closing the inlet of said housing means except to permit introduction of fibrous plant material into said treating area;
   guide means establishing a path for received fibrous plant material through said treating area;
   material moving means including a plurality of spikes extending through said guide means into said path to move fibrous plant material along said path at a rate determined by the speed of movement of said spikes;
   means to supply a preservative as a treating material to said treating area;
   fan means to cause movement of said treating material through said treating area and into contact with fibrous plant material in said path whereby said fibrous plant material is treated while being conveyed along said path; and
   outlet means at said outlet of said housing means whereby said outlet means controls discharge from said treating area, said outlet means including a pair of rollers between which treated fibrous plant material is discharged from said treating area, said outlet means closing the outlet of said housing means except to permit discharge of said treated material from said treating area.

23. The device of claim 22 wherein said guide means are spaced apart arcuate rods to establish an arcuate path for said fibrous plant material in said treating area, and wherein said fan means is positioned within said arcuate rods whereby said treating material is continuously moved outwardly from said fan means through said path to continuously contact fibrous plant material while in said path to thus treat said fibrous plant material.

24. The device of claim 23 wherein said material moving means includes a rotatable drum inside said guide rods, said spikes being spring mounted on the periphery of said drum to thereby effectively extend said drum to said path to thus convey fibrous plant material in said path upon rotation of said drum.

25. A device for treating fibrous plant material, said device comprising:

housing means defining a substantially closed treating area, said housing means having an inlet and an outlet;

inlet means at said inlet of said housing means whereby said inlet means controls access to said treating area, said inlet means including a pair of rollers between which fibrous plant material is received, said inlet means closing the inlet of said housing means except to permit introduction of fibrous plant material into said treating area;

guide means establishing a path for conveying fibrous plant material through said treating area;

means for introducing a preservative as a treating material into said treating area;

fan means to cause movement of said treating material through said treating area and into contact with fibrous plant material in said path whereby said fibrous plant material is treated while in said path; and outlet means at said outlet of said housing means whereby said outlet means controls discharge of treated material from said treating area, said outlet means including a pair of rollers between which treated fibrous plant material is discharged from said treating area, said outlet means closing the outlet of said housing means except to permit discharge of treated material from said treating area.

26. The device of claim 25 wherein said guide means are spaced straight rods positioned at a downward angle from said inlet means to said outlet means whereby fibrous plant material may be moved by gravity along said path within said treating area from said inlet means to said outlet means.

27. The device of claim 26 wherein said fan means is positioned below said rods to direct treating material upwardly through said path established by said rods, and wherein said device includes return means to return treating material to said fan means so that said treating material is continuously circulated through said treating area.

* * * * *